(12) United States Patent
Furusaki

(10) Patent No.: US 6,673,488 B2
(45) Date of Patent: Jan. 6, 2004

(54) PACKAGING FOR POLYMER ELECTROLYTIC CELL AND METHOD OF FORMING SAME

(75) Inventor: Keizo Furusaki, Beachwood, OH (US)

(73) Assignee: NGK Spark Plug Co., Ltd. (JP)

( * ) Notice: Subject to any disclaimer, the term of this patent is extended or adjusted under 35 U.S.C. 154(b) by 296 days.

(21) Appl. No.: 09/911,239

(22) Filed: Jul. 23, 2001

(65) Prior Publication Data

US 2003/0017388 A1 Jan. 23, 2003

(51) Int. Cl.[7] .............................. H01M 2/02; H01M 2/08
(52) U.S. Cl. ..................... 429/163; 429/176; 429/185
(58) Field of Search .............................. 429/162, 163, 429/176, 185; 206/484, 484.2, 703

(56) References Cited

U.S. PATENT DOCUMENTS 6,319,630 B1 * 11/2001 Hasegawa et al. .......... 429/162

FOREIGN PATENT DOCUMENTS

JP     2001-202931    *  7/2001

* cited by examiner

Primary Examiner—Randy Gulakowski
Assistant Examiner—Jonathan Crepeau
(74) Attorney, Agent, or Firm—Mark Kusner; Michael A. Jaffe

(57) ABSTRACT

A battery comprised of a generally rectangular electrochemical cell that has two battery leads attached to current collectors extending from one side thereof. A package formed from a sheet laminate has a cavity formed therein that defines an opening for receiving the cell and portions of the leads. A flange extends around the opening. A cover overlays the cavity and the flange. The cover is joined to the flange and forms a seal that hermetically seals the electrochemical cell within the cavity. The package has two, non-rectangular corners. The cover and the flange in the vicinity of the corners are shaped to allow the flange to be bent along the at least three sides in a manner wherein the flange is positioned adjacent the three sides, but the flange is not tucked or overlapped onto itself at the two, non-rectangular corners.

13 Claims, 6 Drawing Sheets

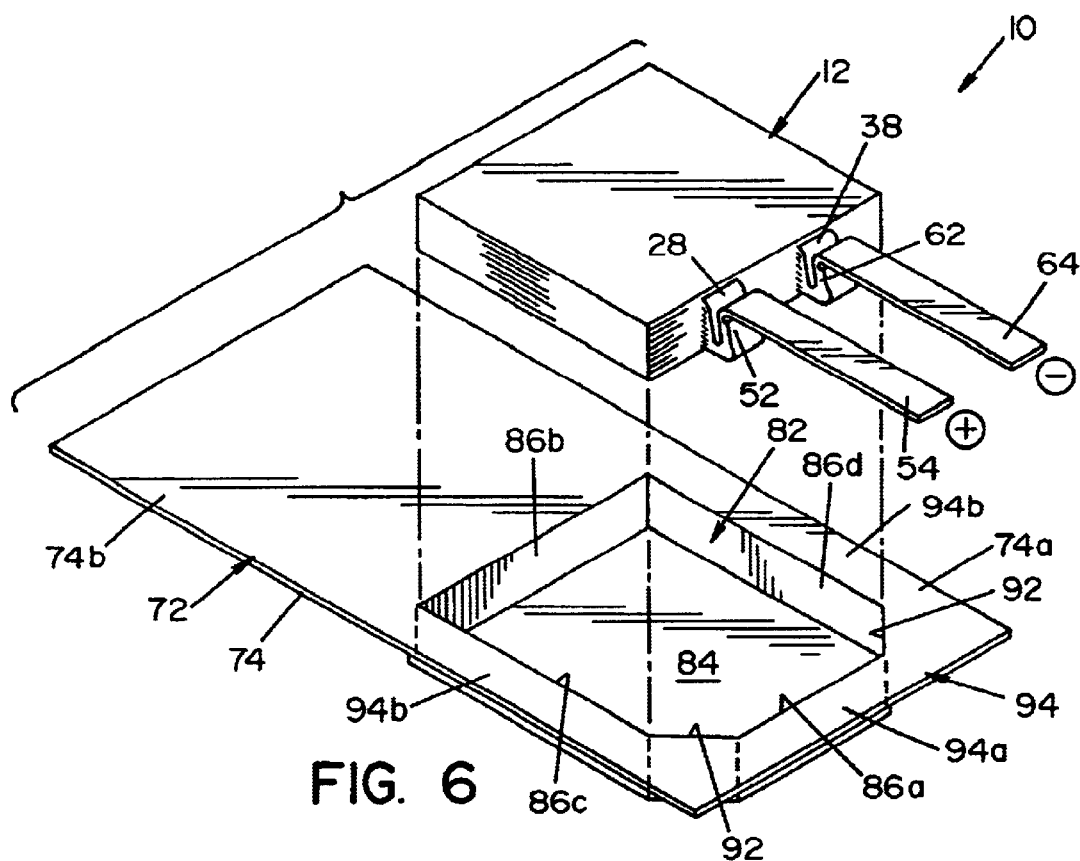
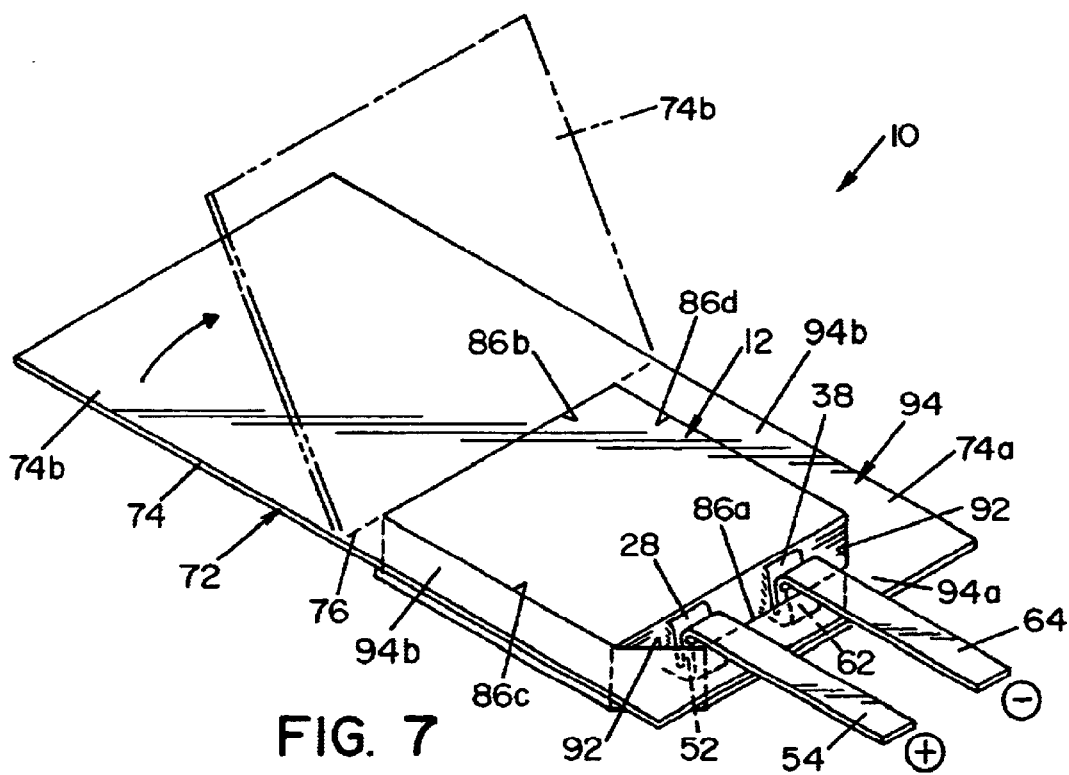

PACKAGING FOR POLYMER ELECTROLYTIC CELL AND METHOD OF FORMING SAME

FIELD OF THE INVENTION

The present invention relates generally to electrochemical devices using liquid or polymer electrolytes or requiring hermetic packaging, and more particularly, to packaging and enclosures for encasing and hermetically sealing an electrolytic cell or battery.

BACKGROUND OF THE INVENTION

Improvements in microelectronics have increased the demand for electrolytic cells and batteries that can be directly incorporated into electronic devices so as to produce a portable, finished package. As the improvements in microelectronics reduce the size of the electronic device, the space allotted to a power supply within such device has likewise decreased. It is therefore important to maximize the power-per-unit space that a battery cell can provide. One way to improve power-per-unit space is to reduce the size of the packaging or enclosure containing the electrolytic cell.

For extremely thin or unusually shaped batteries, flexible packaging has found advantageous application. Flexible packaging can provide hermetic containment of the battery, and in addition, has several advantages over traditional rigid metal or plastic packaging. Foremost, flexible materials are lighter and they can conform more easily to the shape of the battery structure, thus providing easier and more cost effective manufacturing.

The advantages of flexible laminate packaging are particularly valuable for small, high-energy batteries. In general, the smaller the battery becomes in any one dimension, the greater is the contribution of the packaging to the overall power per unit weight and/or power per unit volume of the battery.

The advantages of a flexible laminate packaging may be lost when packaging a non-aqueous battery, such as a high-energy lithium ion battery. If long storage and operating life are to be realized for such batteries, the packaging or enclosure must provide and maintain a hermetic barrier that will prevent electrolytic solvents from escaping from the battery and water vapor and oxygen from penetrating into the battery. Such a barrier is typically provided by a layer of metal foil within the flexible laminate. In order to maintain the hermetic barrier, it is also important that the laminate be formed into a bag or package without significant stretching or deformation of the laminate that may tear or rupture the metal foil layer.

FIGS. 1–5 show a conventional package configuration formed of a flexible laminate for an electrolytic battery. Typically, the packaging is formed from a flexible laminate having a polymer layer for toughness, a metal layer to form a hermetic barrier and an interior adhesive layer. The packaging is typically formed by placing a rectangular electrolytic cell onto one side of a sheet of the flexible laminate. The cell is positioned such that a portion of each of the leads extending from the cell is positioned on the laminate, and a portion of the leads extends beyond the edge of the laminate. The other half of the laminate sheet is then folded over onto the battery to overlay onto the other side of the sheet, with the interior adhesive layer in contact with itself along three peripheral edges where the laminate extends beyond the cell. In this respect, the laminate sheet is dimensioned such that when folded over, it extends beyond three peripheral edges of the cell. Heat and pressure are applied to these three edges to form a seal about the periphery of the cell.

As can be seen in FIG. 4, the sealed regions of the laminate that extend about the three sides of the cell occupy a significant amount of space. If the finished battery is intended to fit into a rectangular cavity within an electronic device, these sealed edges must be folded onto the cell body. The sealed side regions may be folded onto the cell body as illustrated in FIG. 5, but the front edge cannot be folded up without folding, tucking or wrapping the exposed portions of the sides. Such wrapping or tucking would result in several layers of the laminate being overlaid onto each other. Such a built-up region of overlapping laminate layers near the corner of the battery package is undesirable because it places considerable strain on the packaging laminate in the corner regions, which can distort the corners of the cell within the package. As a result, many batteries are used as shown in FIG. 5, with unused, dead space at one end of the battery where the leads extend therefrom. As will be appreciated, such unused space reduces the energy per volume that can be provided in a space allotted for a battery in an electronic device.

The present invention provides a package for a polymer battery that more efficiently utilizes space and provides a compact package having planar outer surfaces.

SUMMARY OF THE INVENTION

In accordance with the present invention, there is provided a package for a polymer battery. The package is comprised of a generally rectangular sheet of a packaging laminate having a cavity formed therein at one end of the sheet. The cavity is generally rectangular in shape and has a bottom, four sides and two truncated corners at two junctions where three of the four sides meet. The cavity is disposed in the sheet such that portions of the sheet define a flange that extends around the three of the four sides of the cavity. A portion of the sheet defines a cover that is folded along a fourth side of the cavity to overlay the flange. A seal is formed between the flange and the cover to hermetically seal the cavity. The flanges and the cover adjacent to the truncated corners are shaped to allow the flanges to be folded parallel to the three of four sides without overlapping.

In accordance with another aspect of the present invention, there is provided a battery comprised of a generally rectangular electrochemical cell having planar top and bottom surfaces and four sides. The electrochemical cell has two battery leads attached to current collectors extending from one side of the cell. A package formed from a sheet laminate has a cavity formed therein. The cavity has a bottom wall and four side walls that extend from the bottom wall to define an opening for receiving the cell and portions of the leads. A flange extends around the opening from at least three of the four side walls. A cover overlays the cavity and the flange. The cover is joined to the flange and forms a seal that hermetically seals the electrochemical cell within the cavity. The package has two, non-rectangular corners. The cover and the flange in the vicinity of the corners are shaped to allow the flange to be bent along the at least three sides wherein the flange is positioned adjacent the three sides, but the flange is not tucked or overlapped onto itself at the two, non-rectangular corners.

It is an object of the present invention to provide a package for small, electrochemical devices, wherein said package is formed of a flexible laminate material.

Another object of the present invention is to provide a method of packaging a prismatic, electrolytic battery with a flexible laminate material.

Another object of the present invention is to provide a method of packaging batteries as described above which maximizes the energy density of the battery.

Another object of the present invention is to provide a method of packaging batteries as described above that reduces the packaging space necessary for hermetically sealing the electrolytic cell.

A still further object of the present invention is to provide a method as described above that finds particular application in forming very thin batteries.

These and other objects will become apparent from the following description of a preferred embodiment taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 6 is an exploded, perspective view showing a multi-layer cell and packaging for receiving the cell, illustrating a preferred embodiment of the present invention;

FIG. 7 is a perspective view of a multi-layer cell and packaging shown in FIG. 6, wherein the multi-layer cell is inserted within the package;

DETAILED DESCRIPTION OF PREFERRED EMBODIMENTS

Figure 1:
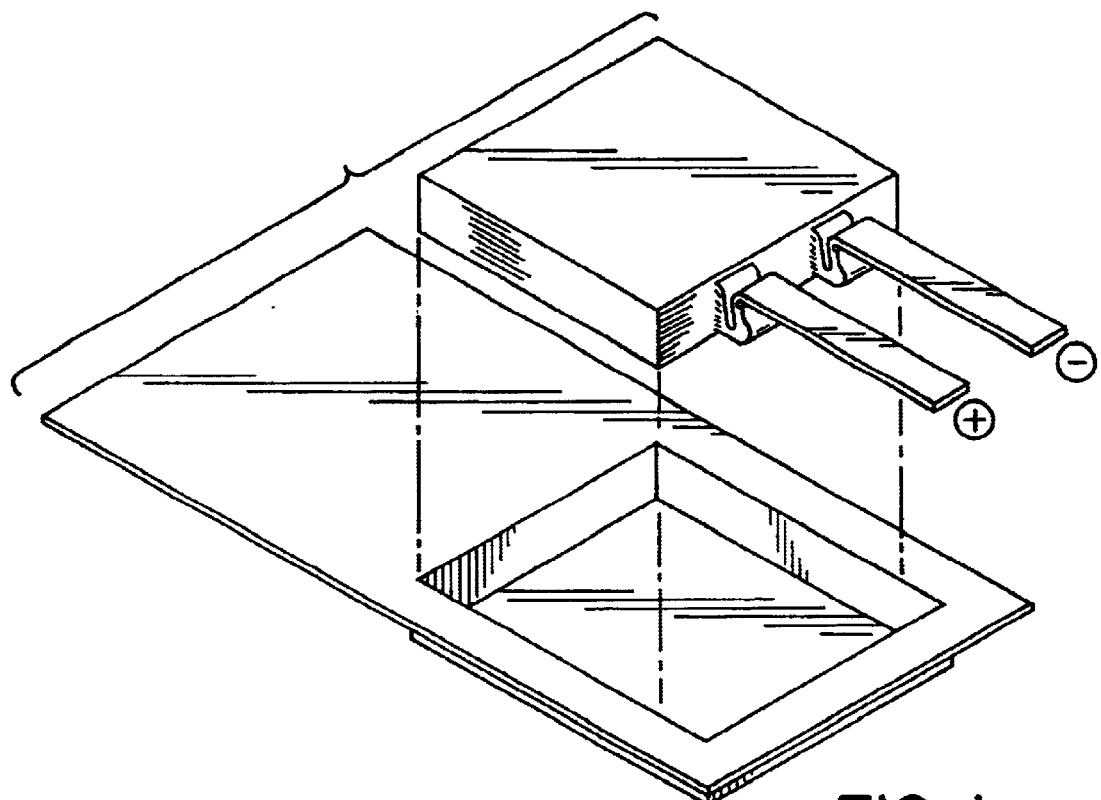
FIGS. 1–5 are views showing a conventional method of forming a battery package from a flexible laminate material.
Figure 2:
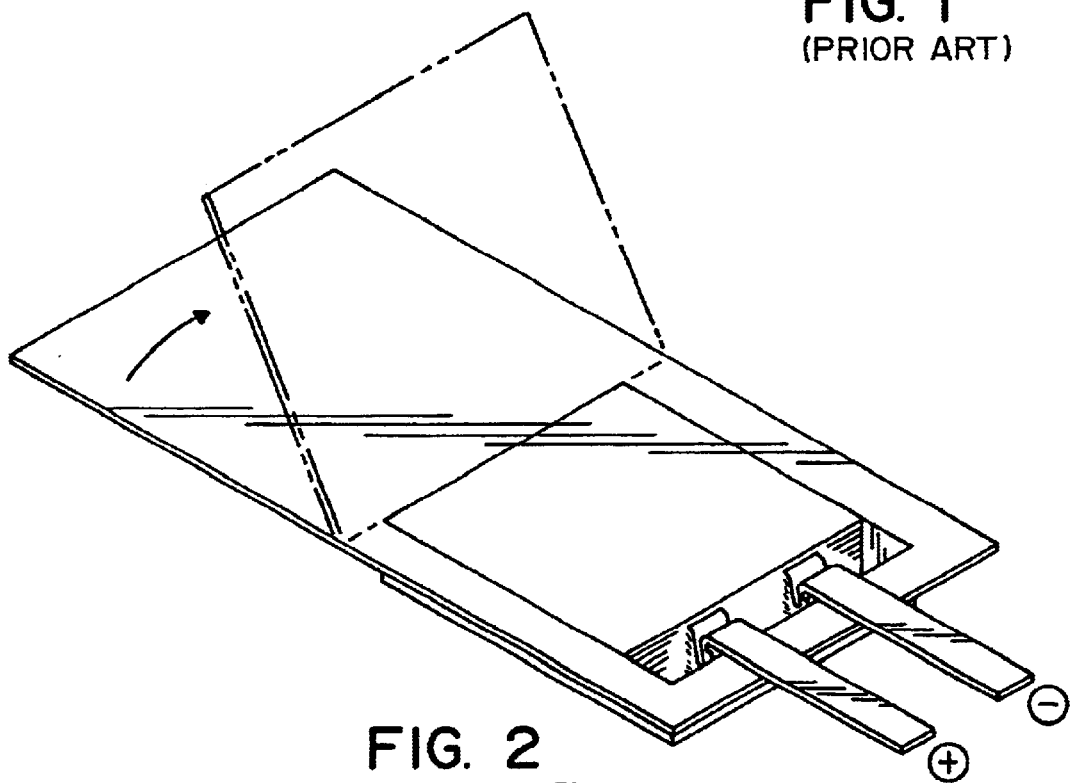
Figure 3:
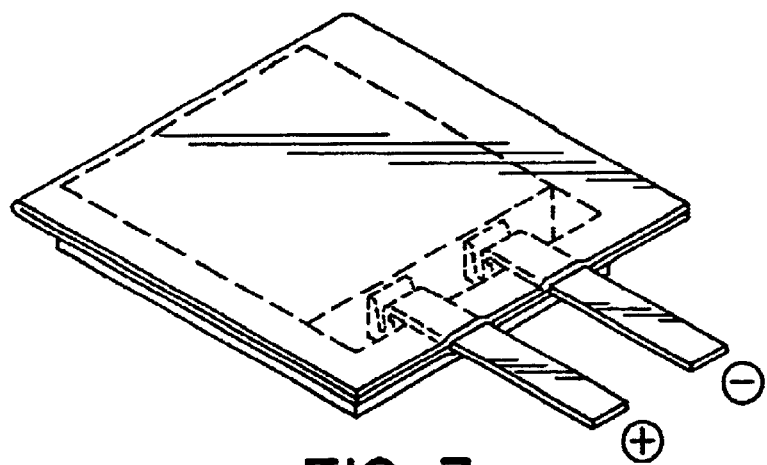
Figure 4:
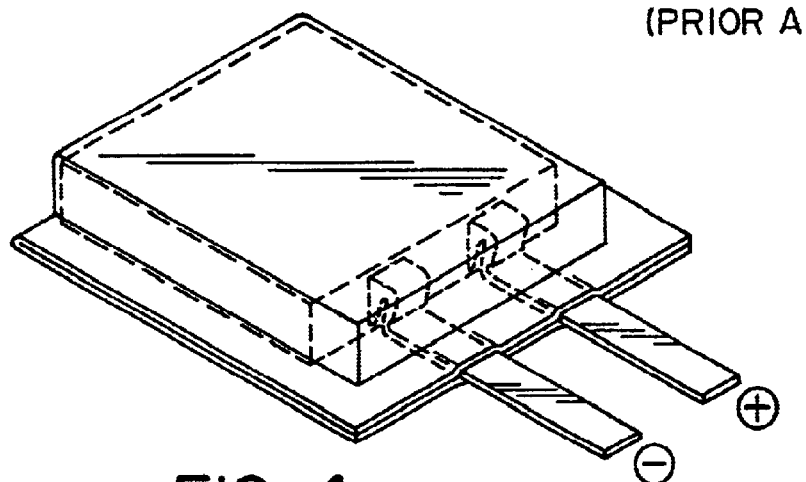

The present invention relates broadly to a multi-cell battery, and more particularly, to a package for containing a multi-layer cell. Referring now to the drawings wherein the showings are for the purpose of illustrating a preferred embodiment of the invention only, and not for the purpose of limiting the same, FIG. 6 shows a battery 10 comprised of a polymeric, electrolytic cell 12 and a package 72 that is formed of a flexible laminate material. Cell 12 is preferably a lithium-based electrochemical cell. Cell 12 may be a primary (non-rechargeable) cell or a secondary (rechargeable) cell.

Figure 9:
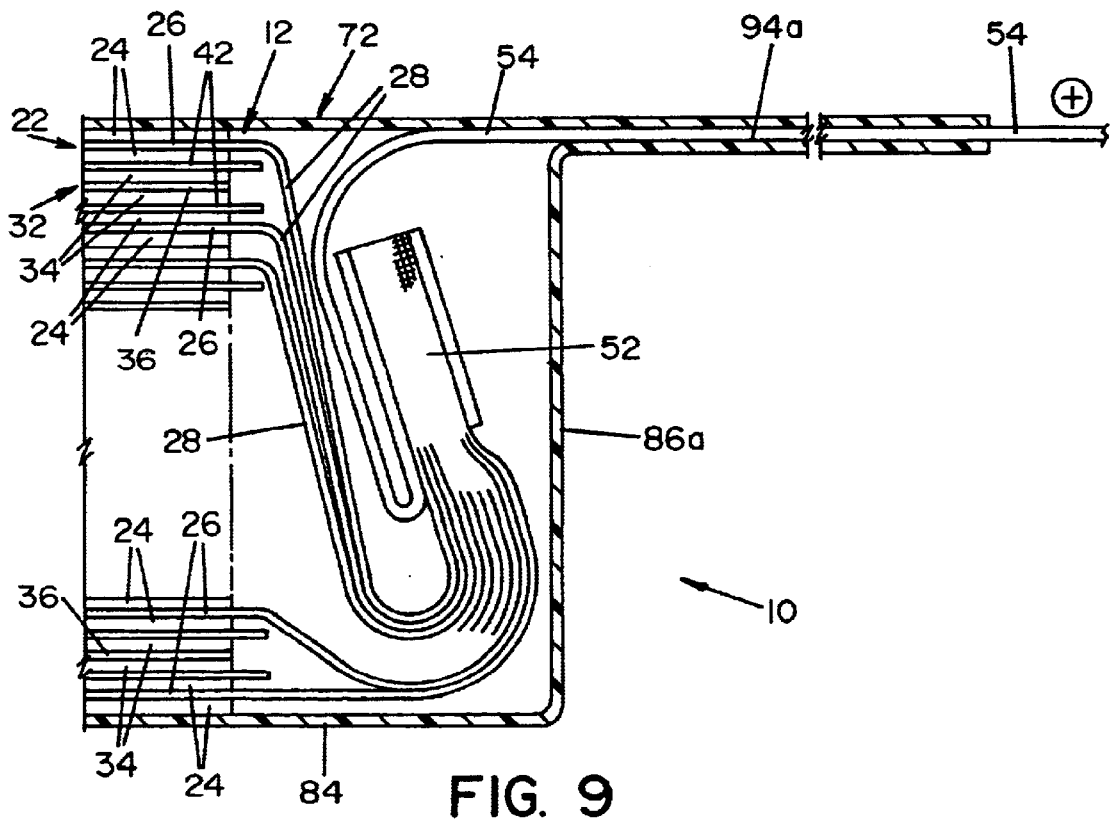
FIG. 9 is a sectional view taken along lines 9—9 of FIG. 8.

In the embodiment shown, cell 12 is comprised of a cathode section 22 and an anode section 32, as best seen in FIG. 9. Each cathode section 22 is comprised of two layers 24 of a cathode film. The film-forming cathode layer 24 is preferably comprised of a lithiated, metal oxide material, an electrically conductive material and a binder material. A current collector 26 formed of a metal screen or mesh is provided between cathode layers 24. Current collector 26 includes an outwardly extending tab or strip 28.

Anode section 32 is comprised of two layers 34 of an anode film having a current collector 36 disposed therebetween. The film-forming anode layers 34 are preferably comprised of a carbonaceous material, an electrically conductive material and a binder material. Current collector 36 includes an outwardly extending tab or strip 38 that defines the negative lead of battery 10, best seen in FIG. 8.

Between anode section 32 and cathode section 22, a separator film layer 42 is disposed. Separator film layer 42 is preferably formed of a polymeric matrix containing an ionically conductive electrolyte.

Each cathode layer 24 preferably has a thickness of about 50 $\mu$m to about 300 $\mu$m, preferably about 100 $\mu$m to about 200 $\mu$m. Each anode layer 34 has a thickness of about 50 $\mu$m to about 300 $\mu$m, preferably about 100 $\mu$m to about 200 $\mu$m. Each separator film layer 42 has a thickness of about 10 $\mu$m to about 75 $\mu$m, preferably about 15 $\mu$m to about 35 $\mu$m. Current collectors 26, 36 are preferably formed of a metal mesh or screen having a thickness of about 25 $\mu$m to about 50 $\mu$m. The overall thickness of cell 12 is about 800 $\mu$m or less, and preferably about 500 $\mu$m or less.

Each current collector tab 28 is joined together into a generally solid cathode tab weldment 52 that is attached to a cathode lead 54. Cathode lead 54 is adapted to project outside of package 72 to form a positive lead of battery 10. In similar respects, each anode current collector tab 38 is joined together into a generally solid anode tab weldment 62 that is attached to an anode lead 64. Anode lead 64 is adapted to project outside of package 72 to form the negative lead of battery 10.

Package 72 is adapted to contain cell 12 in a hermetically sealed fashion and to have cathode and anode leads 54, 64 extending outwardly through package 72. In accordance with the present invention, package 72 is formed of a sheet 74 of a laminate material. Laminate sheet 74 is generally comprised of a metallic foil layer disposed between two polymeric adhesive layers. In a preferred embodiment, laminate sheet 74 is comprised of an inner, aluminum layer and outer layers of polypropylene (PP) or polyethylene (PE). The overall thickness of the laminate is typically between 0.10 mm and 0.15 mm.

Laminate sheet 74 is generally rectangular in shape and has a base portion 74a and a cover portion 74b, that are separated and identified in FIGS. 6 and 7 by a phantom line designated 76, as best seen in FIG. 7. A generally rectangular cavity 82 is formed in base portion 74a of laminate sheet 74. Cavity 82 may be formed by conventional forming means, such as a stamping process or a molding process. Cavity 82 has a bottom wall 84 and four side walls, designated 86a, 86b, 86c and 86d, that define an opening dimensioned to receive cell 12.

Figure 8:
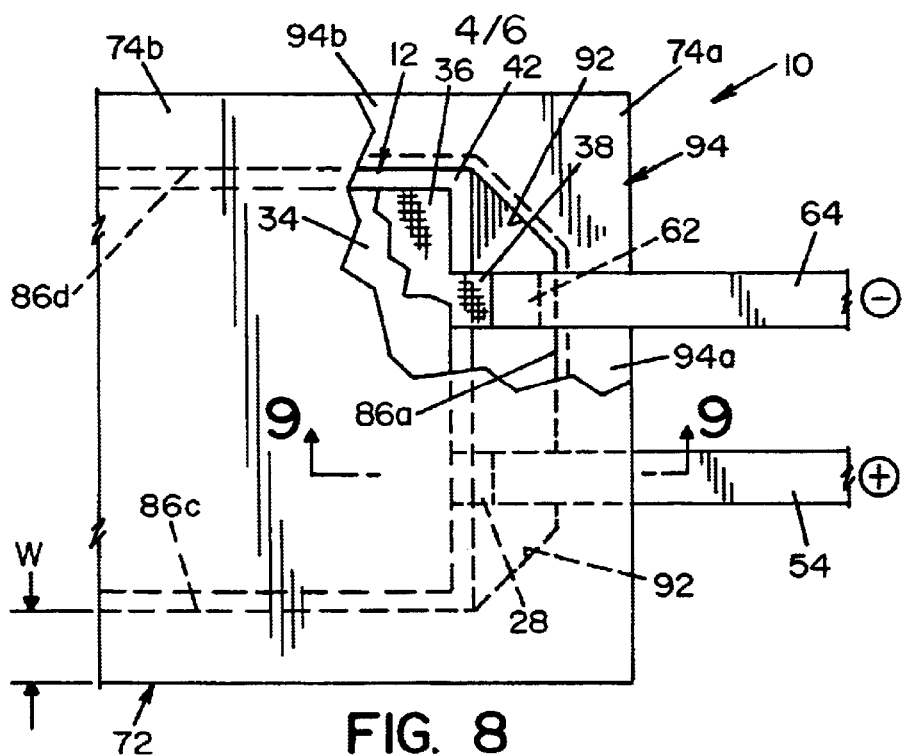
FIG. 8 is an enlarged, partially broken away, top plan view of one end of the cell and packaging shown in FIG. 7.

In accordance with one aspect of the present invention, side walls 86a, 86c and 86d define two corner regions 92, that are located in base portion 74a of laminate sheet 74 where cathode lead 54 and anode lead 64 extend. In accordance with one aspect of the present invention, corner regions are not "squared," as would be the case where two planar surfaces meet at right angles to each other. In the embodiment shown, corner regions 92 are truncated such that one end of cavity 82 nearest the end of the sheet is trapezoidal in shape, as best seen in FIG. 8.

Cavity 82 is disposed within base portion 74a of laminate sheet 74 such that a generally U-shaped flange 94 of sheet material is formed around cavity 82 and extends around three side walls 86a, 86c and 86d. In the embodiment shown, cavity 82 and U-shaped flange 94 comprise base portion 74a of laminate sheet 74, wherein cover portion 74b of laminate sheet 74 extends from side wall 86b.

U-shaped flange 94 has a base portion 94a parallel to side wall 86a and two side portions 94b adjacent side walls 86c, 86d, as best seen in FIG. 6.

Cavity 82 is dimensioned to receive multi-layer cell 12 therein with cathode and anode leads 54, 64 extending over base portion 94a of flange 94. As best seen in FIGS. 7 and 8, tab weldments 52, 62 are disposed within the space defined between truncated corner regions 92.

Figure 10:
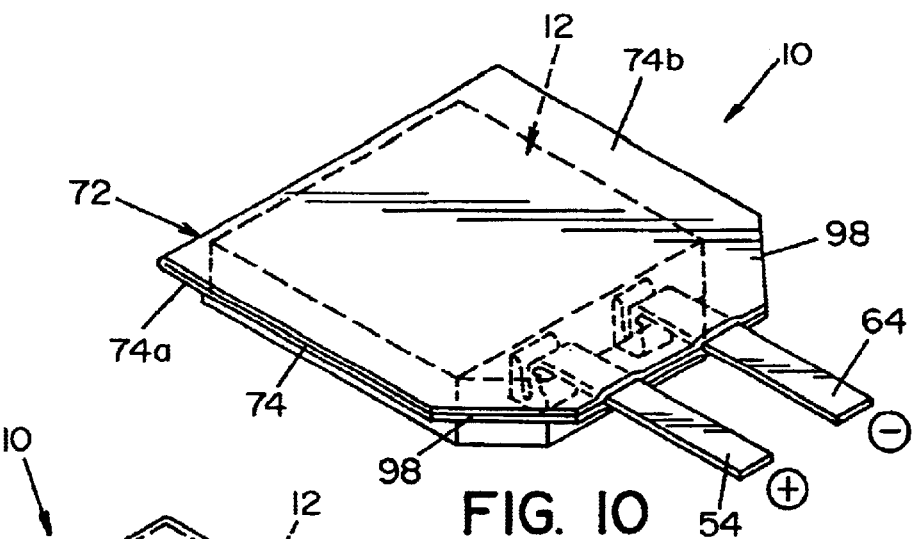
FIG. 10 is a perspective view of an assembled battery package according to the present invention.

Cover portion 74b of laminate sheet 74 is dimensioned to be folded over onto base portion 74a of laminate sheet 74 so as to cover cavity 82 and overlay U-shaped flange 94 and cathode and anode leads 54, 64, as best seen in FIG. 10. Pressure and sufficient heat are applied to laminate sheet 74 along U-shaped flange 94 and the areas of cover portion 74b mating therewith, so as to cause the outer polymer layer of laminate sheet 74 to soften and bond to the polymer layer of cover portion 74b that forms the U-shaped flange 94 of base portion 74a. As a result, a U-shaped, hermetic seal is formed around cell 12, thereby encasing cell 12 within cavity 82. The polymer layer of laminate sheet 74 also forms a seal around the cathode and anode leads 54, 64.

In accordance with conventional practice, the seal formed along U-shaped flange 94 has a predetermined minimum width W, best seen in FIG. 8, that insures an adequate, hermetic seal.

Figure 11:
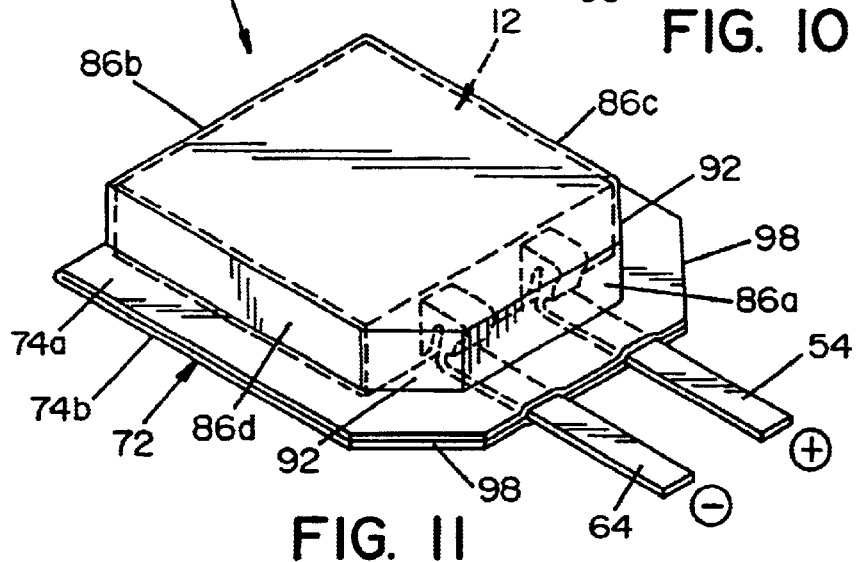
FIG. 11 is a perspective view showing the assembled battery package of FIG. 10 rotated 180° with corners of the packaging removed.
Figure 12:
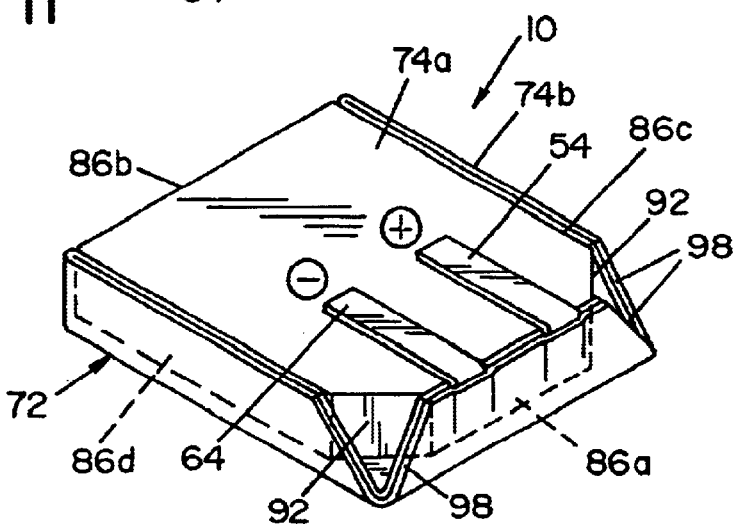
FIG. 12 is a perspective view of an assembled battery package according to the present invention showing the sealed flange area folded up along the sides of the package.

FIG. 11 shows an assembled battery 10 with cell 12 sealed therein. In accordance with another aspect of the present invention, corners 98 of base portion 74a and cover portion 74b are trimmed to remove portions thereof, as best seen in FIGS. 10 and 11. In the embodiment shown, corners 98 are cut along a diagonal to define an edge that is generally parallel to the surface defined by truncated corner regions 92 of cavity 82. Base portion 74a and cover portion 74b are trimmed such that the minimum predetermined width W of the seal is maintained between truncated corner regions 92 of cavity 82 and the edges of corners 98. Still further, truncated corner regions 92 of cavity 82 and the trimmed edges of base portion 74a and cover portion 74b are dimensioned such that the sealed, U-shaped flange may be bent 90° into parallel position relative to side walls 86a, 86c and 86d of cavity 82, as shown in FIG. 12.

Figure 5:
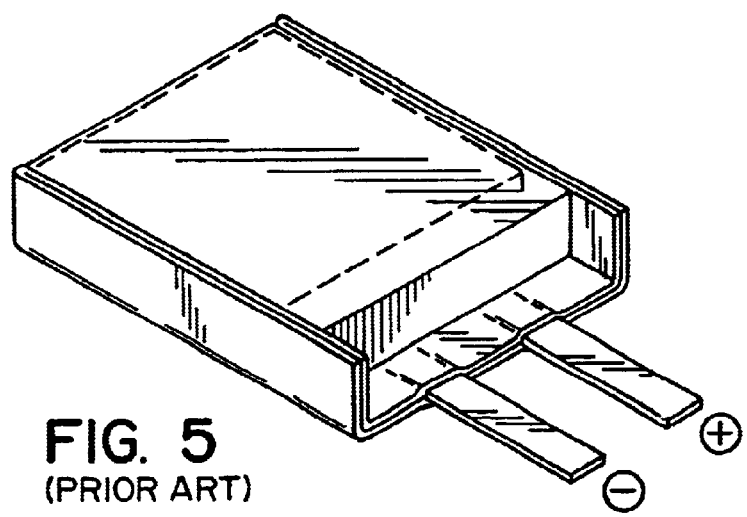

The present invention thus provides a battery 10 having smooth, flat, planar sides that do not require folding or overlapping of packaging layers. Such folding and overlapping increases the overall, outer dimensions of the package, and reduces the usable battery material that can be contained within a given space. Further, such folding or wrapping causes considerable stress and strain on the packaging material, i.e., laminate sheet 74, that may possibly damage inner cell 12. In one respect, by modifying corner regions 92 of battery cavity 82 and trimming the edges of laminate sheet 74 so that the sides may be folded against the package without overlapping or tucking the laminate material, a smooth and well defined package is provided, and the usable internal space, contrasted to a battery package as shown in FIG. 5, is increased. For smaller battery packages in the range of 10 to 200 mm, the foregoing modifications to the package may increase the usable battery space that can be provided within a certain allotted space in an electrical device.

Figure 13:
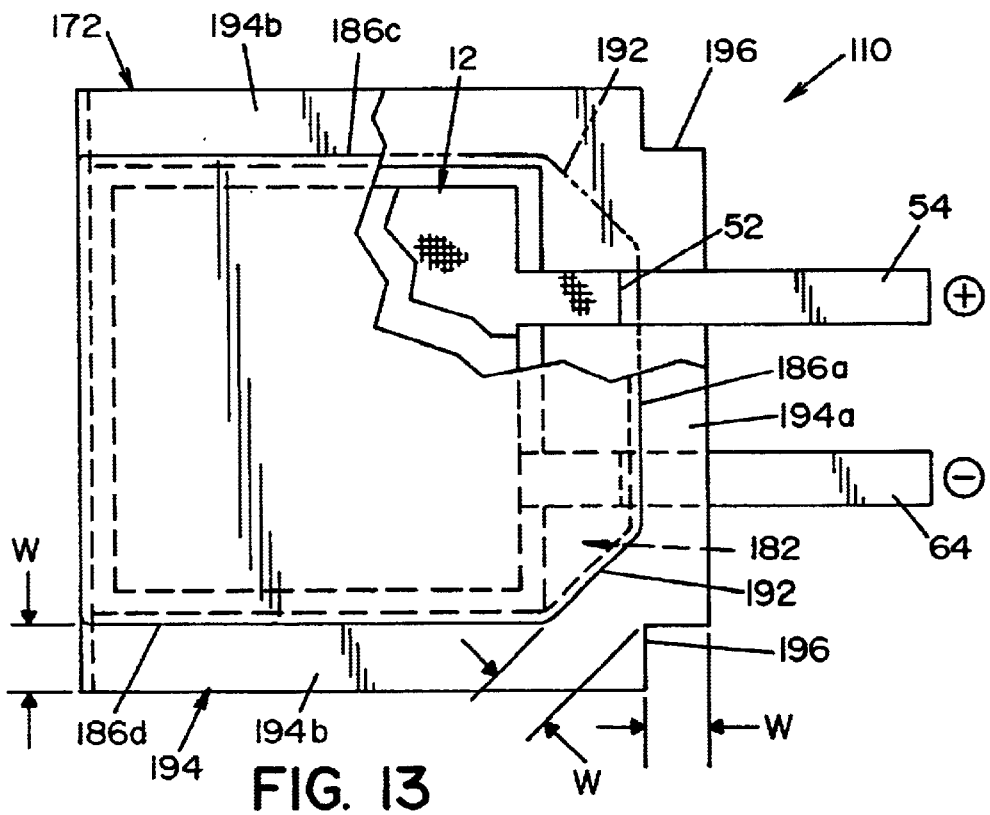
FIG. 13 is a top plan view of an assembled package showing the corner of the package trimmed in accordance with another embodiment of the present invention.

FIG. 13 shows an assembled battery 110 illustrating an alternate embodiment of the present invention. In the embodiment shown, sealed flange 194 has a square notch 196 formed therein (as contrasted with the diagonal cut of the embodiment heretofore described). As will be appreciated, square notch 196 is dimensioned to allow side portions 194b and base portion 194a of the sealed flange 194 to be folded against the three sides 186a, 186c and 186d of battery package 172, while maintaining a minimum sealed dimension W between square notch 196 and corner region 192 of cavity 182, as illustrated in FIG. 13.

Figure 14:
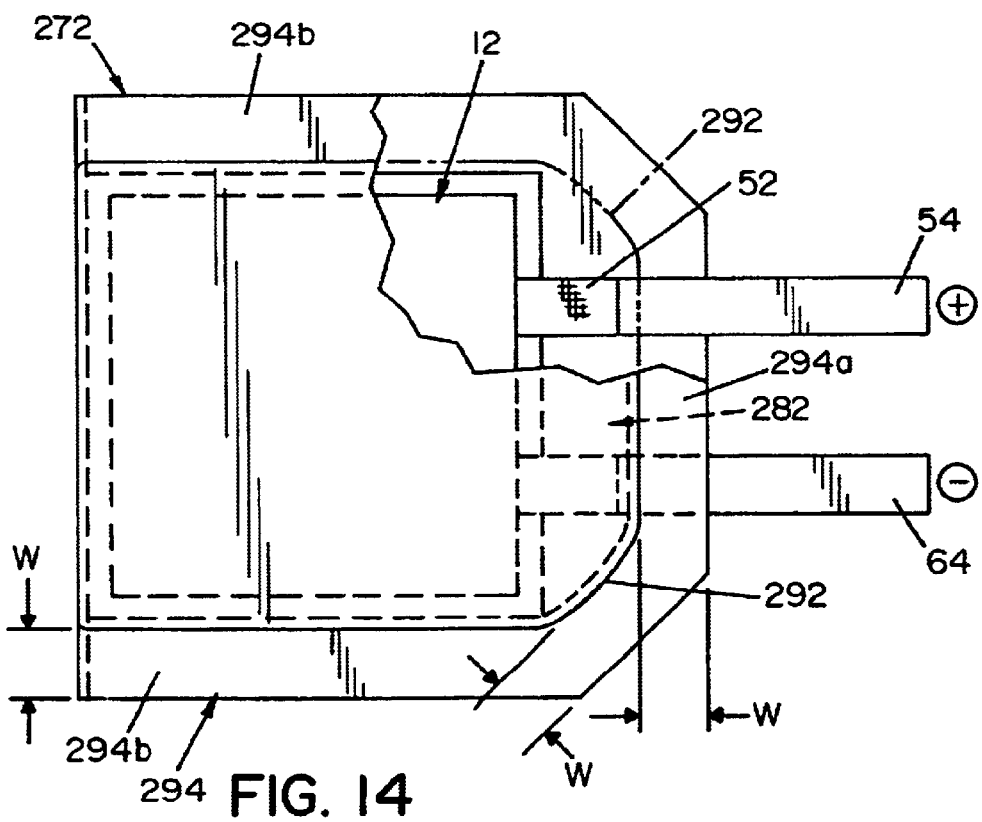
FIG. 14 is a top plan view of an assembled package showing the corners of the package trimmed in accordance with yet another embodiment of the present invention.

FIG. 14 illustrates yet another embodiment of the present invention, wherein a cavity 282 is formed to have rounded corner regions 292. The edges of sealed flange 294 are trimmed so as to maintain a minimum width W between corner regions 292 and the edges of sealed flange 294. In this embodiment, base portion 294a and side portion 294b may be folded against the battery package 272 without deformation or overlapping of the laminate sheet.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A package for a polymer battery, comprised of:
    a generally rectangular sheet of a packaging laminate;
    a cavity formed in said laminate at one end of said sheet, said cavity being generally rectangular in shape and having a bottom, four sides and two truncated corners at two junctions where three of said four sides meet, said cavity being disposed in said sheet such that portions of said sheet define a flange that extends around said three of said four sides of said cavity and a portion of said sheet defines a cover that is folded along a fourth side of said cavity to overlay said flange;
    a seal between said flange and said cover to hermetically seal said cavity; and
    said flanges and said cover adjacent to said truncated corners being shaped to allow said flanges to be folded parallel to said three of four sides without overlapping.

2. A package for a polymer battery as defined in claim 1, wherein said sheet of packaging laminate is comprised of a metallic foil layer disposed between two polymeric layers.

3. A package for a polymer battery as defined in claim 1, wherein said truncated corners are flat surfaces and said flanges and said cover adjacent to said truncated corners are formed to have straight edges that are generally parallel to said flat surfaces.

4. A package for a polymer battery as defined in claim 1, wherein said seal has uniform width about said three of four sides.

5. In a battery, comprised of:
    a generally rectangular electrochemical cell having planar top and bottom surfaces and four sides, said electrochemical cell having two battery leads attached to current collectors extending from one side of said cell;
    a package formed from a sheet laminate having a cavity formed therein, said cavity having a bottom wall and four side walls that extend from said bottom wall to define an opening for receiving said cell and portions of said leads;

a flange extending around said opening from at least three of said four side walls; and a cover overlying said cavity and said flange, said cover joined to said flange and forming a seal that hermetically seals said electrochemical cell within said cavity, the improvement comprising:

said package having two, non-rectangular corners that are defined by flat surfaces disposed at angles to said side walls, and said cover and said flange in the vicinity of said corners being shaped to allow said flange to be bent along said at least three sides wherein said flange is positioned adjacent said three sides, but said flange is not tucked or overlapped onto itself at said two, non-rectangular corners.

6. A battery as defined in claim 5, wherein said battery includes an anode weldment and a cathode weldment wherein said two battery leads attach to said current collectors.

7. A battery as defined in claim 6, wherein said weldments are disposed within said cavity between said two, non-rectangular corners.

8. A battery as defined in claim 5, wherein said cover and said flange adjacent to said corners are formed to have straight edges that are generally parallel to said flat surface.

9. A battery as defined in claim 8, wherein said seal has a generally uniform width along said at least three sides.

10. In a battery comprised of:

a generally rectangular electrochemical cell having planar top and bottom surfaces and four sides, said electrochemical cell having two battery leads attached to current collectors extending from one side of said cell;

a package formed from a sheet laminate having a cavity formed therein, said cavity having a bottom wall and four side walls that extend from said bottom wall to define an opening for receiving said cell and portions of said leads;

a flange extending around said opening from at least three of said four side walls; and a cover overlying said cavity and said flange, said cover joined to said flange and forming a seal that hermetically seals said electrochemical cell within said cavity, the improvement comprising:

said cavity having two, non-rectangular corners, and said cover and said flange in the vicinity of said corners being shaped to allow said flange to be bent along said at least three sides wherein said flange is positioned adjacent said three sides, but said flange is not tucked or overlapped onto itself at said two, non-rectangular corners.

11. A battery as defined in claim 10, wherein said non-rectangular corners of said package are circular.

12. A battery as defined in claim 11, wherein said cover and said flange adjacent to said corners are formed to maintain a minimum width from said cavity.

13. A battery as defined in claim 12, wherein said seal has a generally uniform width along said at least three sides.

* * * * *